(12) United States Patent
Nakagawa

(10) Patent No.: US 8,274,621 B2
(45) Date of Patent: Sep. 25, 2012

(54) DISPLAY DEVICE AND MANUFACTURING METHOD OF DISPLAY DEVICE

(75) Inventor: Hidetoshi Nakagawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 329 days.

(21) Appl. No.: 12/601,710

(22) PCT Filed: Dec. 25, 2007

(86) PCT No.: PCT/JP2007/074795
§ 371 (c)(1),
(2), (4) Date: Nov. 24, 2009

(87) PCT Pub. No.: WO2008/152757
PCT Pub. Date: Dec. 18, 2008

(65) Prior Publication Data
US 2010/0177270 A1 Jul. 15, 2010

(30) Foreign Application Priority Data
Jun. 15, 2007 (JP) .................................. 2007-158426

(51) Int. Cl.
*G02F 1/1333* (2006.01)
(52) U.S. Cl. .............. 349/54; 349/192; 349/73; 349/74; 349/128; 445/24
(58) Field of Classification Search .................. 349/192, 349/73, 74, 128, 54; 445/24
See application file for complete search history.

(56) References Cited

U.S. PATENT DOCUMENTS

| 5,619,062 | A | * | 4/1997 | Janai et al. | 257/529 |
| 6,335,771 | B1 | * | 1/2002 | Hiraishi | 349/42 |
| 2001/0028418 | A1 | * | 10/2001 | Ozaki et al. | 349/54 |
| 2006/0012729 | A1 | | 1/2006 | Tanaka et al. | |
| 2009/0027606 | A1 | * | 1/2009 | Nakanishi | 349/143 |

FOREIGN PATENT DOCUMENTS

| JP | 04-018730 | * | 1/1992 |
| JP | 7-28076 | | 1/1995 |
| JP | 2003-156763 | * | 5/2003 |
| JP | 2004-347891 | | 12/2004 |

OTHER PUBLICATIONS

International Search Report for PCT/JP2007/074795, mailed Jan. 22, 2008.

* cited by examiner

*Primary Examiner* — Edward Glick
*Assistant Examiner* — Sang Nguyen
(74) *Attorney, Agent, or Firm* — Nixon & Vanderhye P.C.

(57) ABSTRACT

A display device 1 according to the present invention, having a display area AA capable of image display and a nondisplay area PA provided outside the display area AA, includes a first wiring line 14 and a second wiring line 20 in the nondisplay area PA. The second wiring line 20 is arranged across an insulating layer 17 from the first wiring line 14, so that a crossover section 25 at which the first wiring line 14 intersects with the second wiring line 20 is provided. The second wiring line 20 includes a plurality of branch lines 22, 23 branching therefrom and being located in the crossover section 25, while the first wiring line 14 includes a plurality of slit portions 260A, 270A and the like crossing the branch lines 22, 23.

10 Claims, 16 Drawing Sheets

DISPLAY DEVICE AND MANUFACTURING METHOD OF DISPLAY DEVICE

This application is the U.S. national phase of International Application No. PCT/JP2007/074795 filed 25 Dec. 2007, which designated the U.S. and claims priority to JP Application No. 2007-158426 filed 15 Jun. 2007, the entire contents of each of which are hereby incorporated by reference.

TECHNICAL FIELD

The present invention relates to a display device and a manufacturing method of a display device.

BACKGROUND ART

A display device, such as a liquid crystal display device, an EL display device or a plasma display device, is conventionally known, in which an image can be displayed by selectively driving a plurality of pixels arranged in a matrix. An active matrix driving method is known as a driving method for the display device. In the active matrix display device, gate bus lines and source bus lines are arranged in a grid pattern on a transparent substrate, while switching elements such as TFTs provided for respective pixels are arranged in the vicinities of respective intersections of the gate bus lines and the source bus lines.

Each TFT includes a gate electrode branching from the gate bus line, a source electrode branching from the source bus line, and a drain electrode connected to the pixel electrode, for example. Further, a transparent substrate that includes a counter electrode is provided so as to face the transparent substrate that includes the pixel electrodes. Each pixel is driven by a voltage that is applied between the pixel electrode and the counter electrode based on a signal from the source bus line, when a selection signal is received from the gate bus line.

In the display device, when a leak has occurred between intersecting wiring lines such as a peripheral wiring line extending in Y-direction and a gate bus line extending in X-direction of the display device, a signal cannot be transmitted properly beyond the short-circuited portion of the gate bus line. This will cause a linear area that includes defective display (i.e., line defect). The techniques described in Patent Documents 1 and 2 are known as methods for fixing a defect developed at the intersection between wiring lines, for example.
Patent Document 1: JP-A-2003-156763
Patent Document 2: JP-A-H7-28076

Problem to be Solved by the Invention

Patent Document 1 discloses a technique that provides gate bus lines, each of which branches into a plurality of wiring lines so that at least one of two branch points is arranged within an area overlapped with a common electrode provided for storage capacitor bus lines. An opening section is provided on each overlapped area, so that a branch line can be cut off by laser irradiation through the opening section in order to eliminate a short circuit. Patent Document 2 discloses a technique that provides a large hole region on each crossover section of a wiring line, so that a short-circuited portion can be isolated by forming cut parts extending from the respective ends of the hole region by use of energy beam irradiation.

As well as an intruding foreign substance having conductivity, a contact hole due to a defect of an insulating film can be cited as factors causing the above leak. Some wiring lines of a display device should be circumferentially arranged, and the growing size of a display device in recent years has led to increase in lengths of wiring lines particularly arranged in the nondisplay area. Meanwhile, the wiring lines are set to be large also in line width so that the electrical resistance of the wiring lines is maintained to be low in spite of the increase in line lengths thereof. The increased widths of the wiring lines will lead to relative increase in chances of intrusion of a foreign substance and/or formation of a contact hole due to a defect of the insulating film.

In this regard, the invention disclosed in Patent Document 1 enables cutoff of the limited number of wiring lines, and therefore repairs of more leak spots than the limited number is impossible. In the case of the invention disclosed in Patent Document 2, a beam should be radiated individually to each leak spot, which may cause a significant reduction in manufacturing efficiency.

DISCLOSURE OF THE INVENTION

The present invention was made in view of the foregoing circumstances, and an object thereof is to provide a display device in which a leak spot at an intersection of wiring lines in a nondisplay area can be fixed with high efficiency and with certainty. A further object of the present invention is to provide a manufacturing method of the display device.

Means for Solving the Problem

In order to solve the above problem, a display device according to the present invention, having a display area capable of image display and a nondisplay area provided outside the display area, includes a first wiring line and a second wiring line in the nondisplay area. The second wiring line is arranged across an insulating layer from the first wiring line, so that a crossover section at which the first wiring line intersects with the second wiring line is provided in the nondisplay area. The second wiring line includes a plurality of branch lines branching therefrom and being located in the crossover section, while the first wiring line includes a plurality slit portions arranged to cross the branch lines in the crossover section.

According to the present display device, when a leak has occurred in the crossover section at which the first wiring line intersects with the second wiring line, the leak can be fixed by cutting off a branch line (i.e., a wiring line branching from the second wiring line), with less time and effort. When one branch line is solely left uncut as a result of repeated repairs, the leak can be fixed by cutting off a wiring line portion adjacent to a slit portion of the first wiring line, starting at the slit portion. Thus, the leak spot can be fixed with high efficiency and with certainty.

Some wiring lines of a display device should be circumferentially arranged, and the growing size of a display device has led to increase in lengths of wiring lines particularly arranged in the nondisplay area. Meanwhile, the wiring lines are set to be large also in line width so that the electrical resistance of the wiring lines is maintained to be low in spite of the increase in line lengths thereof. The increased widths of the wiring lines will lead to relative increase in chances of intrusion of a foreign substance onto a wiring line and/or formation of a contact hole due to a defect of the insulating layer, resulting in an increased possibility of a leak at an intersection of wiring lines. In order to enable highly-efficient and certain repair of a leak, the present invention provides a display device that includes a multiple of repair means in the area prone to leaks.

According to the construction, when a leak has occurred, the leak can be first fixed by cutting off a branch line that is one of the plurality of branch lines branching from the second wiring line and corresponds to the leak spot. Even when leaks have occurred at a plurality of spots, all the leak spots can be fixed by cutting off one branch line if the leak spots are on the same branch line. In this case, repairs can be achieved with extremely high efficiency.

If the plurality of leak spots are not on the same branch line, the pertinent branch lines should be sequentially cut off. Also in this case, repairs can be efficiently achieved with less time and effort, compared to repairs involving cutting of a wiring line portion adjacent to a slit portion with a starting point at the slit portion.

In most cases, the leaks can be eliminated by repetition of the above repairs. However, a leak may be sometimes left unrepaired when one branch line is solely left uncut. In this case, cutting of the last one branch line will result in disconnection on the second wiring line, which contributes to reduction in quality of the display device.

For this reason, the leak will be fixed by cutting off a wiring line portion, by use of a slit portion corresponding to the leak spot. That is, in the present construction where the slit portions are provided on the first wiring line so as to cross the branch lines, the first wiring line can be certainly isolated from a branch line by cutting off a portion of the first wiring line adjacent to an end area of a slit portion with a starting point at the end area. Thus, the leak can be eliminated. According to the construction thus including a plurality of slit portions, a leak spot can be separated off as appropriate according to the size thereof by cutting off a wiring line portion between the slit portions. Thereby, an undue increase in the resistance of the wiring lines can be suppressed.

When the slit portions are thus provided on the first wiring line having a relatively large width, increase of the resistance of the wiring lines due to the provision of slit portions can be suppressed. Further, cutting of a branch line can be efficiently achieved, because the branch lines are provided on the second wiring line having a relatively small width.

The nondisplay area can be formed to have a frame-like shape surrounding the display area, and at least one of the first wiring line and the second wiring line may be provided as a peripheral wiring line that is peripherally arranged along at least one side of the nondisplay area having a frame-like shape.

The peripheral wiring line, thus peripherally arranged in the frame-like nondisplay area, should have a large length. Further, the width thereof should be set to be large, in order to enable stable supply of signals. The increased width of the wiring line will lead to relative increase in chances of intrusion of a foreign substance onto the wiring line and/or formation of a contact hole due to a defect of the insulating layer, resulting in an increased possibility of a leak at an intersection of wiring lines.

However, the leak can be fixed with high efficiency and with certainty, if the branch lines and the slit portions according to the present invention are employed in the construction thus including the peripheral wiring line peripherally arranged along at least one side of the frame-like nondisplay area.

A thin-film transistor can be provided in the display area. The first wiring line may be provided as a peripheral wiring line that is peripherally arranged in the nondisplay area so as to supply a signal for capacitance formed in the display area. The second wiring line may include at least one wiring line provided as a gate wiring line that is arranged to supply a gate signal to the gate electrode of the thin-film transistor.

BEST MODE FOR CARRYING OUT THE INVENTION

An embodiment according to the present invention will be explained with reference to FIGS. 1 to 13. Hereinafter, a liquid crystal display device will be described as an embodiment of a display device.

Figure 1:
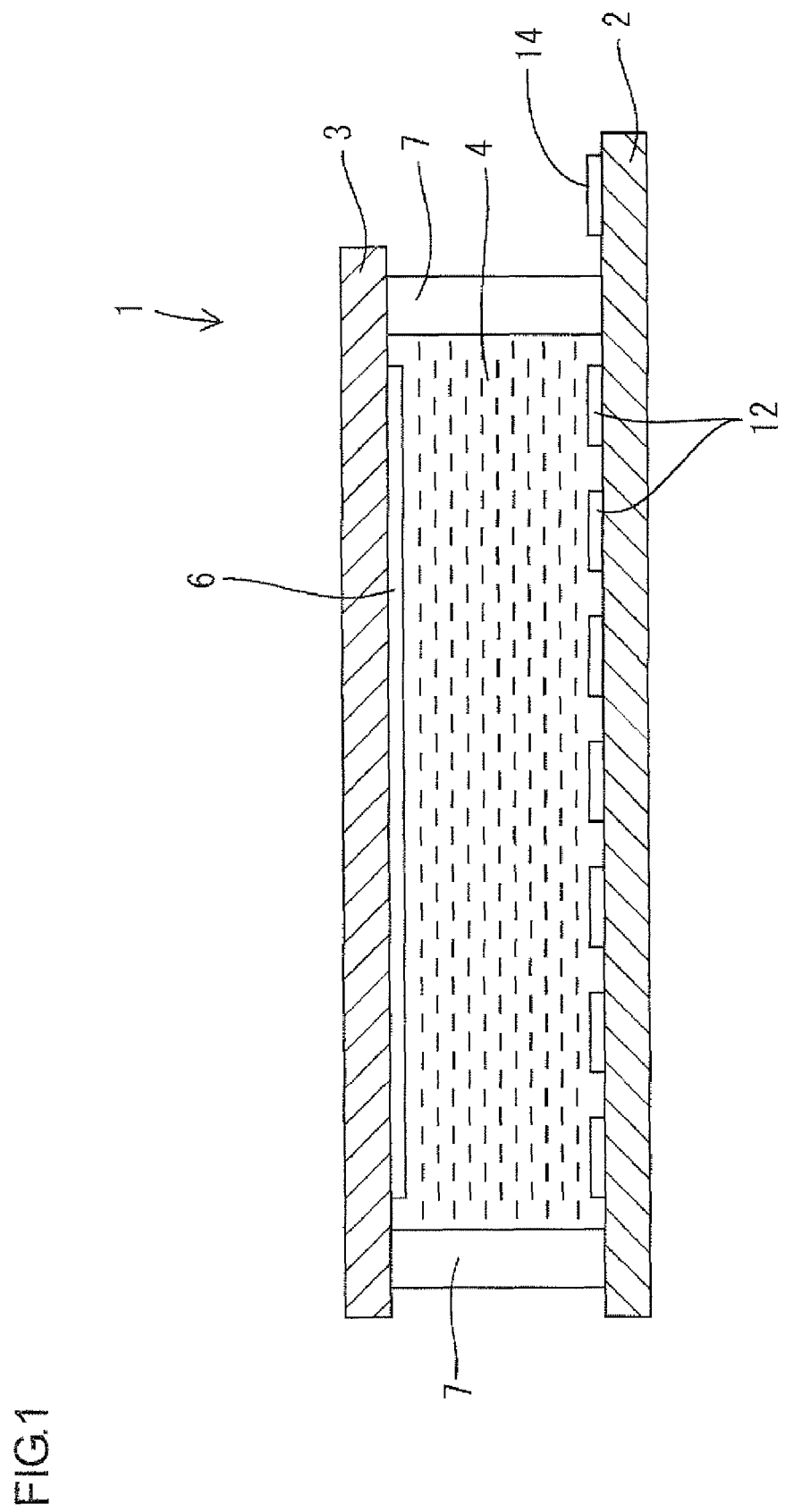
FIG. 1 is a diagram schematically showing the sectional configuration of a liquid crystal display device according to an embodiment of the present invention.
Figure 2:
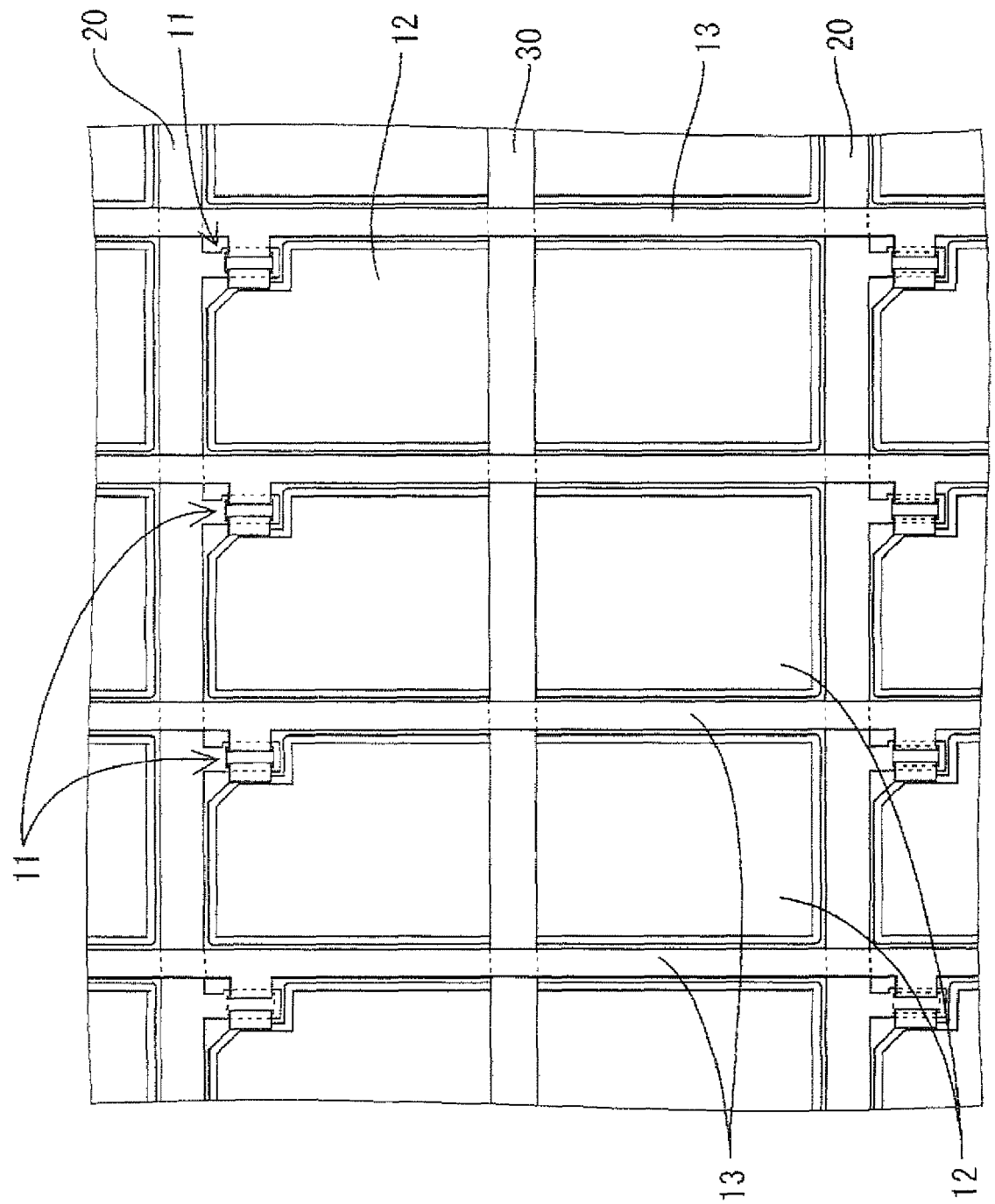
FIG. 2 is a schematic plan view showing the configuration of pixels of the liquid crystal display device shown in FIG. 1.
Figure 3:
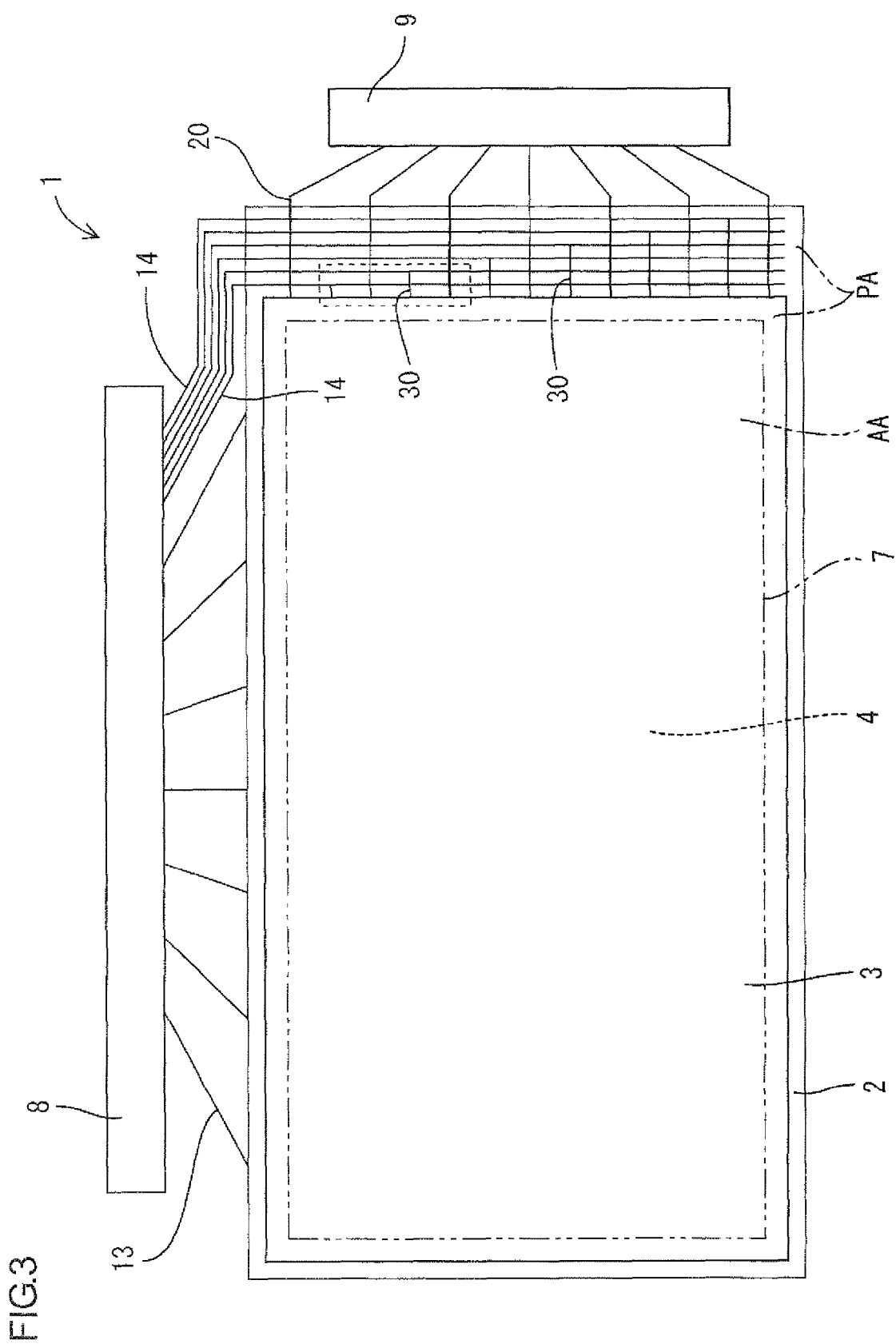
FIG. 3 is a plan view schematically showing the driver circuits and the wiring configuration of the liquid crystal display device shown in FIG. 1.

FIG. 1 is a diagram schematically showing the sectional configuration of the liquid crystal display device according to the present embodiment. FIG. 2 is a schematic plan view showing the configuration of pixels of the liquid crystal display device. FIG. 3 is a plan view schematically showing the driver circuits and the wiring configuration of the liquid crystal display device.

In the liquid crystal display device 1 of the present embodiment, referring to FIG. 1, a liquid crystal layer 4 is sandwiched between a pair of substrates 2, 3 so as to fill the rectangular area formed on the inner side of a sealant 7.

The substrate 2 is provided as an element substrate, which includes TFTs (Thin-Film Transistors) 11 as switching elements (See FIG. 2) and pixel electrodes 12 arranged in a matrix and connected to the respective TFTs 11. On the other hand, the substrate 3 is provided as an opposite substrate, which includes a common electrode 6 arranged solidly on the substrate surface.

Referring to FIG. 3, the liquid crystal display device includes a display area AA as a planar area corresponding to the liquid crystal layer 4, and further includes a nondisplay area PA that forms a frame-like shape surrounding the periphery of the display area AA.

On the substrate 2, a plurality of source wiring lines 13 for supplying an image signal from a source driver 8 to each pixel, a plurality of gate wiring lines (corresponding to a second wiring line) 20 for supplying a gate signal from a gate driver 9 to the TFT 11 of each pixel, and storage capacitor lines (corresponding to a second wiring line) 30 for supplying an electrical signal for the capacitance of each pixel are provided in the nondisplay area PA. Further, peripheral wiring lines (corresponding to a first wiring line) 14 capable of supplying an electrical signal from the source driver 8 to the storage capacitor lines 30 are peripherally arranged along one side of the nondisplay area PA. The storage capacitor lines 30 are connected, via contact holes (described below), to the peripheral wiring lines 14 connected to the source driver 8.

On the substrate 2, referring to FIG. 2, the display area AA includes a number of pixel electrodes 12 arranged in a matrix, and the source wiring lines 13 and the gate wiring lines 20 running around the pixel electrodes 12 and intersecting each other at right angles. The central area of each pixel electrode 12 is arranged across an insulating layer from the storage capacitor line 30, and thereby a storage capacitor is provided to correspond to the central area. An image signal (or a drive voltage) is written into each pixel section, when the TFT 11 is turned ON. The voltage is held on the storage capacitor even after the TFT 11 turns OFF, due to the storage capacitor line 30 arranged in the pixel section.

The peripheral wiring lines 14 are formed of a wiring layer that is formed by the same process as for the source wiring lines 13. That is, the peripheral wiring lines 14 are formed of the same layer and the same material as the source wiring lines 13 (e.g., a material having a Ti/Al structure). On the other hand, the gate wiring lines 20 and the storage capacitor lines 30 are formed of a wiring layer formed by the same process. That is, they are formed of the same layer and the same material (e.g., a material having a Ti/Al/TiN structure).

Next, the configurations of the peripheral wiring lines 14 and the gate wiring lines 20, and defect repair means provided on the wiring lines will be explained with reference to FIGS. 4 to 7.

Figure 4:
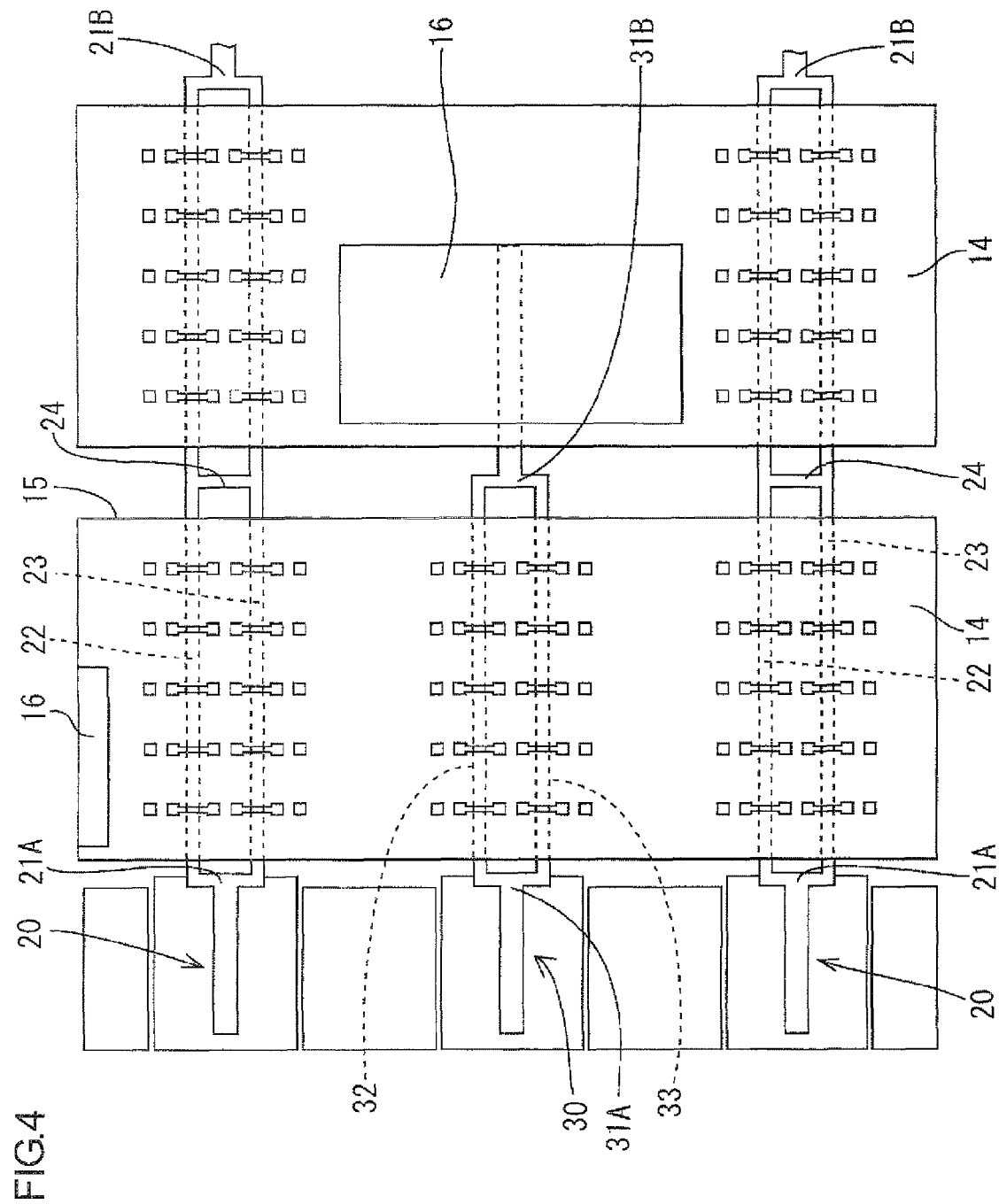
FIG. 4 is a partially-enlarged plan view of FIG. 3.
Figure 5:
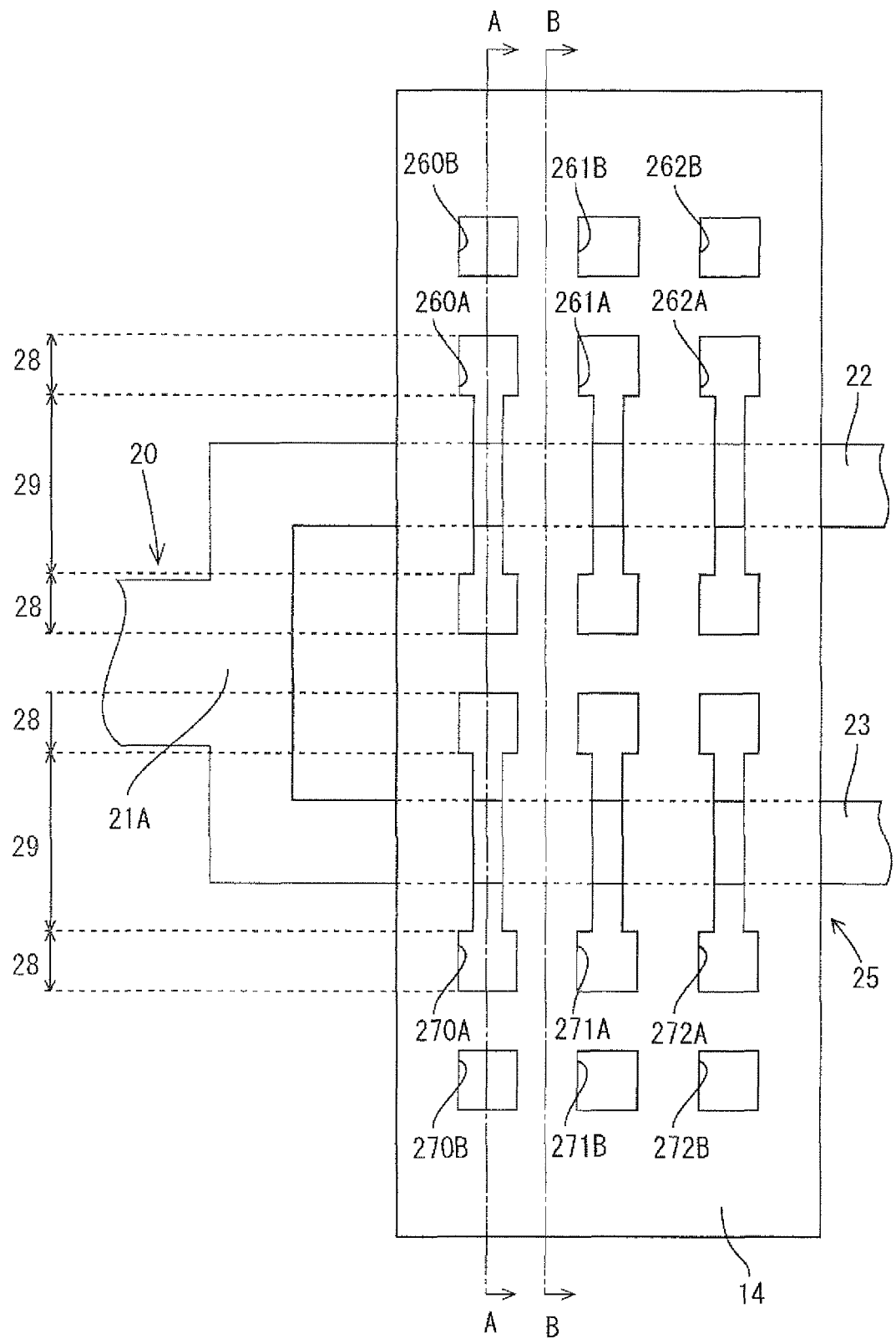
FIG. 5 is a partially-enlarged plan view of FIG. 4.
Figure 6:
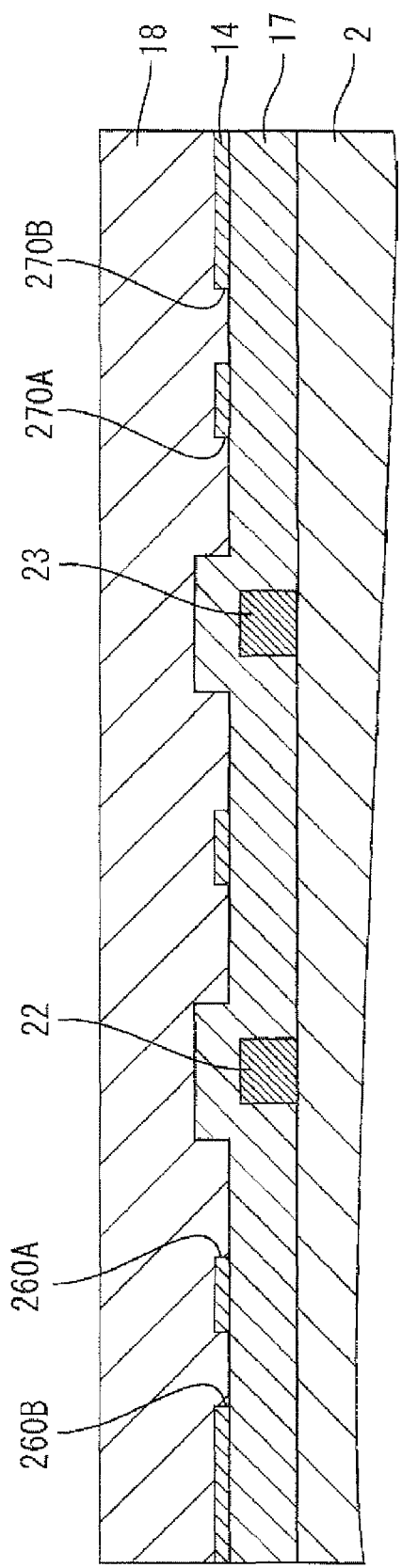
FIG. 6 is a sectional view of FIG. 5 along the line A-A.
Figure 7:
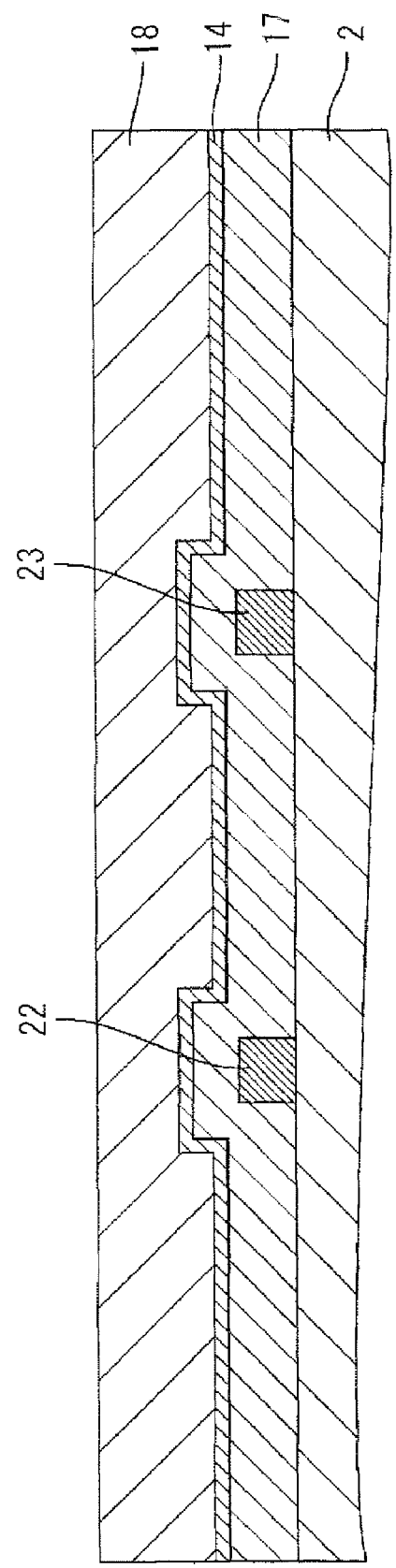
FIG. 7 is a sectional view of FIG. 5 along the line B-B.

FIG. 4 is a schematic plan view that magnifies the area bounded by a dashed line in FIG. 3. FIG. 5 is a partially-enlarged plan view of FIG. 4, showing a section at which a peripheral wiring line 14 intersects with a gate wiring line 20. FIG. 6 is a sectional view of FIG. 5 along the line A-A. FIG. 7 is a sectional view of FIG. 5 along the line B-B.

Referring to FIGS. 4 to 7, the peripheral wiring lines 14 and the gate wiring lines 20 are arranged to intersect each other, while a gate insulator 17 is arranged therebetween. The width of each peripheral wiring line 14 is set to a value between 500.0 µm and 600.0 µm (e.g., 500.0 µm), while the width of each gate wiring line 20 is set to a value between 10 µm and 30 µm (e.g., 30.0 µm). Thus, the width of the peripheral wiring line 14 is set to be larger than the width of the gate wiring line 20.

Referring to FIG. 4, each gate wiring line 20 includes branch points 21A, 21B, which are located at two points so that parallel-arranged two peripheral wiring lines 14 are arranged therebetween. Two branch lines 22, 23, extending from one 21A of the branch points, cross or intersect with the two peripheral wiring lines 14, and converge at the other 21B of the branch points.

The gate wiring line 20 further includes a link line 24 that is arranged in the gap section 15 between the two peripheral wiring lines 14 so as to be connected between the branch lines 22, 23.

In each crossover section 25 at which a gate wiring line (or branch lines 22 and 23) and a peripheral wiring line 14 intersect each other, referring to FIG. 5, slit portions 260A, 270A, 261A, 271A, 262A, 272A and the like (hereinafter sometimes collectively referred to as "slit portions 260A and the like" or "slit portions 270A and the like") are provided as defect repair means to be used for fixing a defect such as a leak when the defect has occurred.

The slit portions 260A, 270A and the like are formed on the peripheral wiring line 14. The slit portions 260A and the like are arranged to cross the branch line 22, while the slit portions 270A and the like are arranged to cross the branch line 23. The slit portions 260A and the like are arranged so as not to cross the branch line 23, while the slit portions 270A and the like are arranged so as not to cross the branch line 22.

The slit portions 260A and the like or 270A and the like are formed of a plurality of parallel slits arranged evenly spaced apart. The slit length is set to a value between 35.0 µm and 50.0 µm (e.g., 40.0 µm). On the slit portions 260A, 270A and the like, the slit width is set to be smaller at the medial area 29 of each slit 260A, 270A or the like, i.e., at areas except both end areas 28 thereof, than at the both end areas 28. Specifically, the both end areas 28 of the slit portions 260A, 270A and the like are individually formed into a rectangular shape, or more specifically, into a square shape, on which each side thereof is set to a length between 6.0 µm and 10.0 µm (e.g., 8.0 µm). On the other hand, the slit width is set to a value between 4.0 µm and 6.0 µm (e.g., 4.0 µm) at the medial area 29 or at areas except the both end areas 28.

Further, in each crossover section 25, as shown in FIG. 5, cutout portions 260B, 270B, 261B, 271B, 262B, 272B and the like (hereinafter sometimes collectively referred to as "cutout portions 260B and the like" or "cutout portions 270B and the like") are provided, which are arranged at a predetermined distance from the respective slit portions 260A, 270A, 261A, 271A, 262A, 272A and the like and along the longitudinal direction of the slit portions 260A, 270A, 261A, 271A, 262A, 272A and the like. The cutout portions 260B, 270B and the like are provided also as defect repair cutout portions or defect repair means to be used for fixing a defect, and are formed on the peripheral wiring line 14.

This is the end of explanation of the configurations of the peripheral wiring lines 14 and the gate wiring lines 20. Next, the configurations of the peripheral wiring lines 14 and the storage capacitor lines 30, and defect repair means provided on the wiring lines will be explained with reference to FIGS. 4 and 8 to 10.

Figure 8:
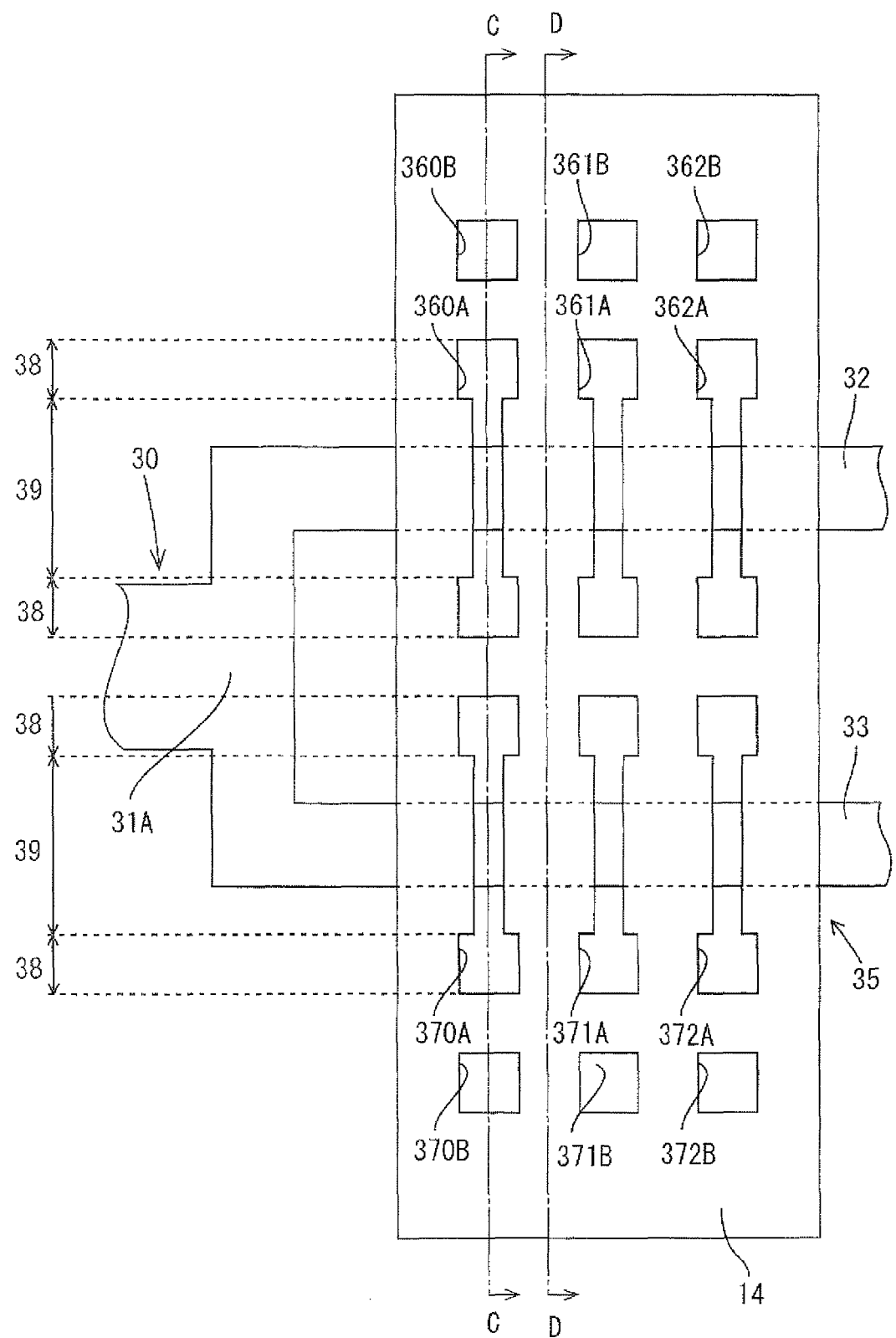
FIG. 8 is a partially-enlarged plan view of FIG. 4.
Figure 9:
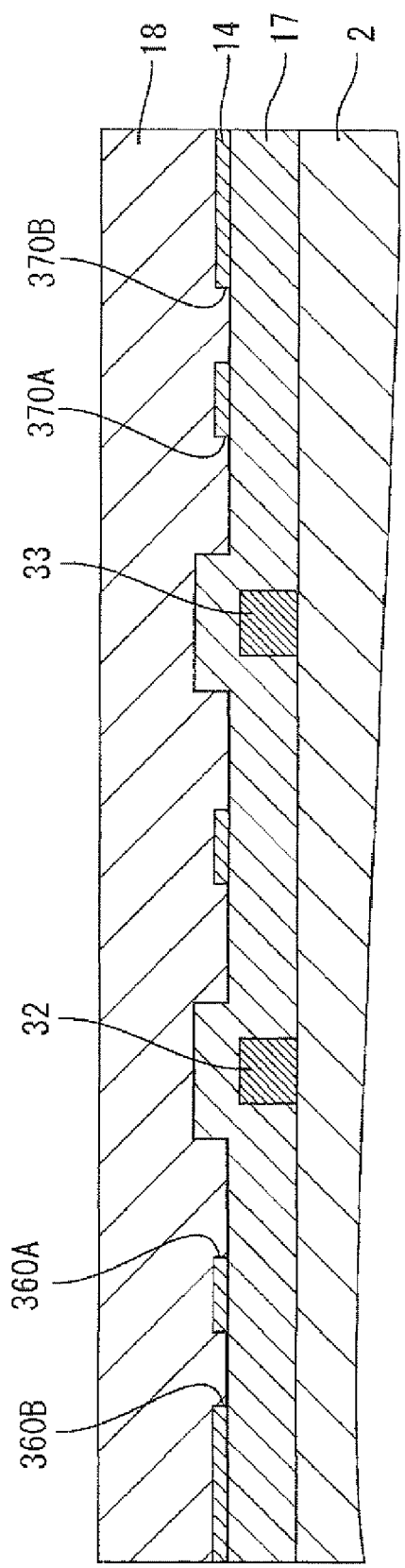
FIG. 9 is a sectional view of FIG. 8 along the line C-C.
Figure 10:
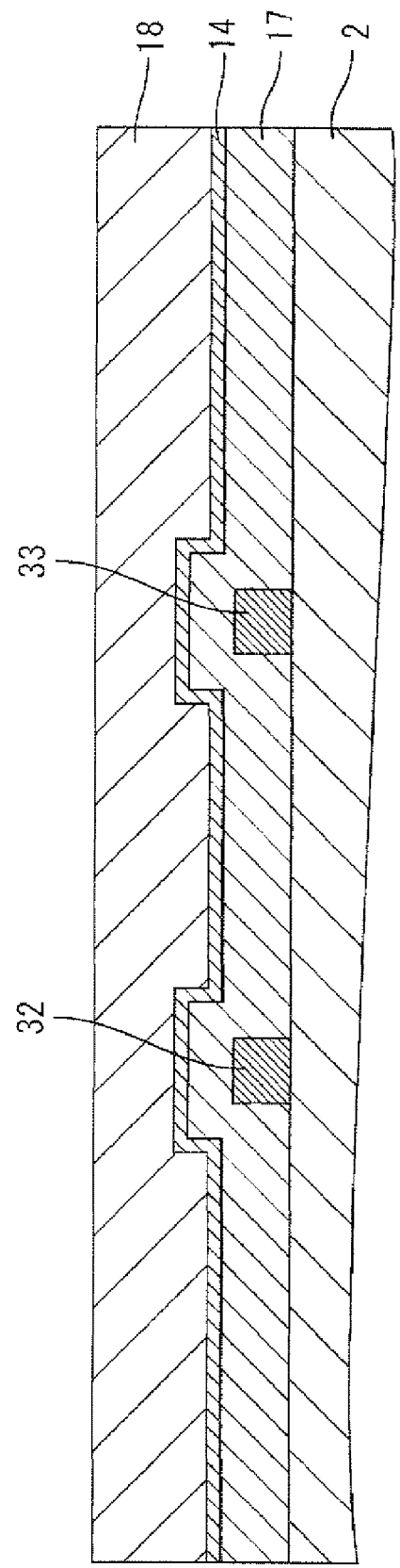
FIG. 10 is a sectional view of FIG. 8 along the line D-D.

FIG. 8 is a partially-enlarged plan view of FIG. 4, showing a section at which a peripheral wiring line 14 intersects with a storage capacitor line 30. FIG. 9 is a sectional view of FIG. 8 along the line C-C. FIG. 10 is a sectional view of FIG. 8 along the line D-D.

Referring to FIGS. 4 and 8 to 10, the peripheral wiring lines 14 and the storage capacitor lines 30 are arranged to intersect each other, while the gate insulator 17 is arranged therebetween. The width of each peripheral wiring line 14 is set to a value between 500.0 µm and 600.0 µm (e.g., 500.0 µm), while the width of each storage capacitor line 30 is set to a value between 10 µm and 30 µm (e.g., 20.0 µm). Thus, the width of the peripheral wiring line 14 is set to be larger than the width of the storage capacitor line 30.

Referring to FIG. 4, each storage capacitor line 30 includes branch points 31A, 31B, which are located at two points so that one peripheral wiring line 14 is arranged therebetween. Two branch lines 32, 33, extending from one 31A of the branch points, cross or intersect with the one peripheral wiring line 14, and converge at the other 31B of the branch points.

The storage capacitor lines 30 are connected to the peripheral wiring lines 14, via contact holes 16 provided on the peripheral wiring lines 14.

In each crossover section 35 at which a storage capacitor line 30 (or branch lines 32 and 33) and a peripheral wiring line 14 intersect each other, referring to FIG. 8, slit portions 360A, 370A, 361A, 371A, 362A, 372A and the like (hereinafter sometimes collectively referred to as "slit portions 360A and the like" or "slit portions 370A and the like") are provided as defect repair means to be used for fixing a defect such as a leak when the defect has occurred.

The slit portions 360A, 370A and the like are formed on the peripheral wiring line 14. The slit portions 360A and the like are arranged to cross the branch line 32, while the slit portions 370A and the like are arranged to cross the branch line 33. The slit portions 360A and the like are arranged so as not to cross the branch line 33, while the slit portions 370A and the like are arranged so as not to cross the branch line 32.

The slit portions 360A and the like or 370A and the like are formed of a plurality of parallel slits arranged evenly spaced apart. The shapes thereof are the same as those of the above-described slit portions 260A and the like or 270A and the like provided in each crossover section 25 at which a gate wiring line 20 intersects with a peripheral wiring line 14. That is, the slit widths of the slit portions 360A, 370A and the like are set to be smaller at the medial area 39, i.e., at areas except both end areas 38 thereof, than at the both end areas 38.

Further, in each crossover section 35, as shown in FIG. 8, cutout portions 360B, 370B, 361B, 371B, 362B, 372B and the like (hereinafter sometimes collectively referred to as "cutout portions 360B and the like" or "cutout portions 370B and the like") are provided, which are arranged at a predetermined distance from the respective slit portions 360A, 370A, 361A, 371A, 362A, 372A and the like and along the longitudinal direction of the slit portions 360A, 370A, 361A, 371A, 362A, 372A and the like. The cutout portions 360B, 370B and the like are provided also as defect repair cutout portions or defect repair means to be used for fixing a defect, and are formed on the peripheral wiring line 14.

The gate insulator 17 arranged between the peripheral wiring lines 14 and gate wiring lines 20 or the storage capacitor lines 30 can be formed of silicon oxide, or alternatively, can be formed of a laminated film, such as a laminated film of silicon oxide and a semiconductive material, a laminated film of silicon oxide, a semiconductive material and SOG (Spin On Glass), or a laminated film of silicon oxide and SOG (Spin On Glass). As shown in FIGS. 6, 7, 9 and 10, a passivation film 18 formed of silicon oxide and the like is provided on the peripheral wiring lines 14.

According to the present construction of the liquid crystal display device, when a defect such as a leak has occurred at an intersection of wiring lines, the defect can be fixed with high efficiency and with certainty, as appropriate according to the size and position of the defective area.

Figure 11:
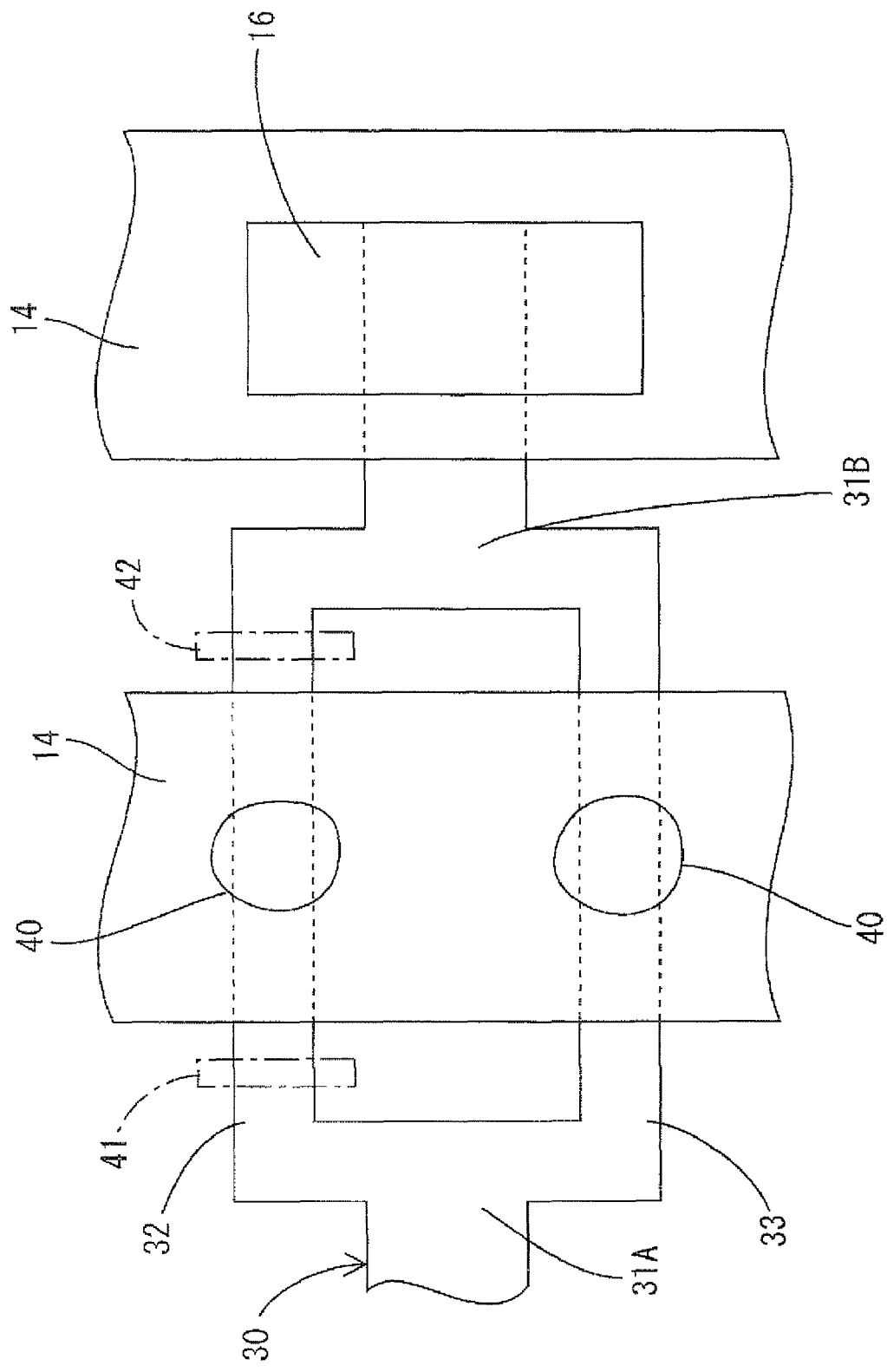
FIG. 11 is an explanatory diagram showing the operational effects of the liquid crystal display device according to the present embodiment.

For example, referring to FIG. 11 (where the slit portions 360A, 370A and the like and the cutout portions 360B, 370B and the like are not shown), when foreign substances 40 slip into crossover areas at which a peripheral wiring line 14 intersects with the respective branch lines 32, 33 of a storage capacitor line 30, defects such as leaks between the lines can be appropriately fixed.

Specifically, the branch line 32 is cut off by laser radiation at a point located between the peripheral wiring line 14 and the branch point 31A of the storage capacitor line 30 and at a point located between the peripheral wiring line 14 and the branch point 31B, so that the branch line 32 is isolated by the laser-cut portions (or laser-irradiated portions designated by Symbols 41 and 42). Consequently, a failure caused by the defect such as a leak at the branch line 32 can be fixed.

If repairs are performed on the branch line 33 in a similar manner to that of the above repairs, the repairs will result in disconnection on the storage capacitor line 30, which contributes to reduction in quality of the liquid crystal display device 1.

For this reason, the defect at the branch line 33 will be fixed by utilizing the slit portions 370A and the like and the cutout portions 370B and the like provided on the peripheral wiring line 14.

Figure 12:
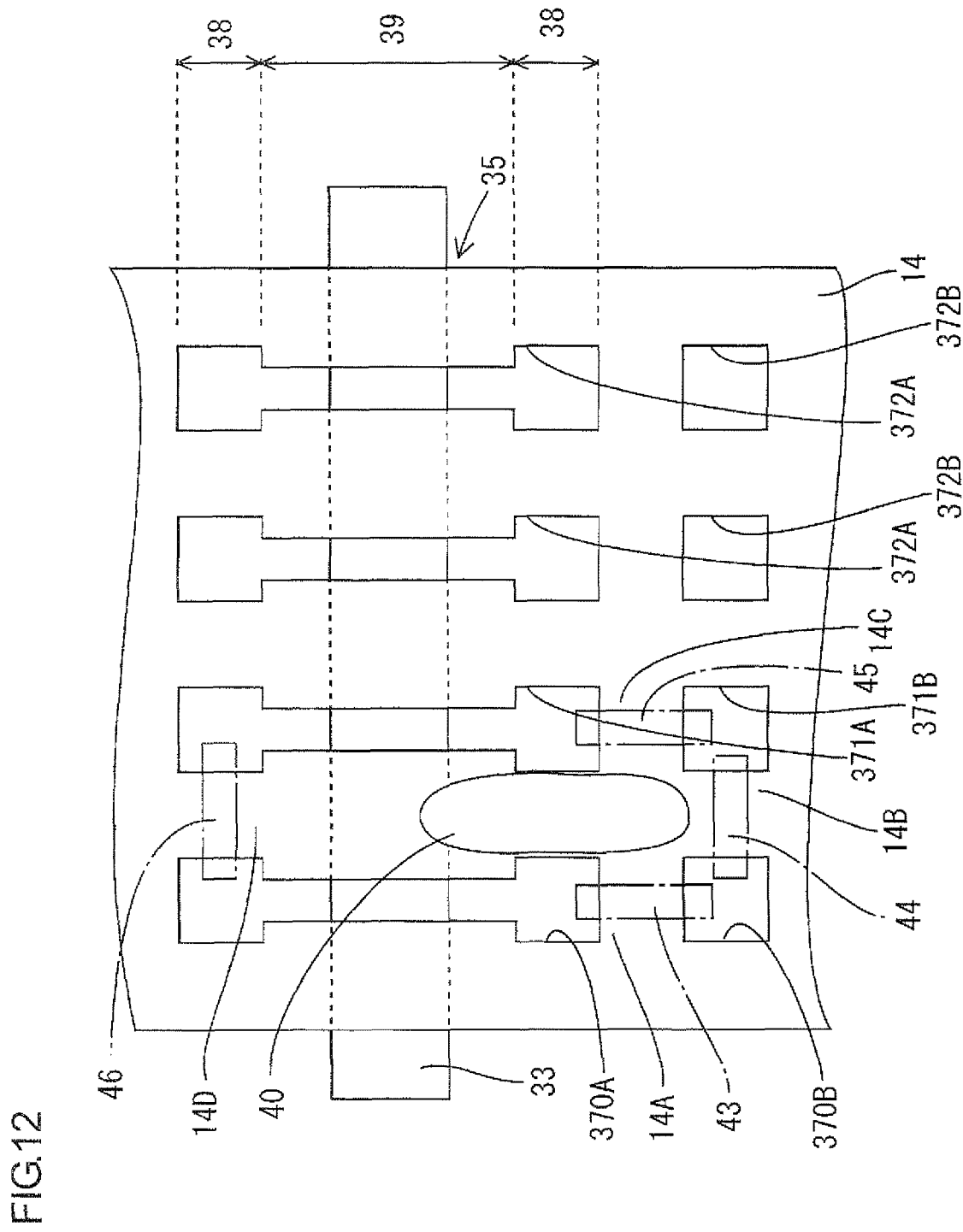
FIG. 12 is an explanatory diagram showing the operational effects of the liquid crystal display device according to the present embodiment.

Specifically, referring to FIG. 12, a portion 14A of the wiring line (i.e., the peripheral wiring line 14) connecting an end area 38 of the slit portion 370A and the cutout portion 370B is cut off by laser radiation, so that the end area 38 of the slit portion 370A communicates with the cutout portion 370B due to the laser-cut portion (or laser-irradiated portion designated by Symbol 43). Similarly, a laser-cut portion (or laser-irradiated portion 44) is formed, so that a portion 14B of the wiring line connecting the cutout portion 370B and the cutout portion 371B is cut off. Further, a laser-cut portion (or laser-irradiated portion 45) is formed, so that a portion 14C of the wiring line connecting the cutout portion 371B and an end area 38 of the slit portion 371A is cut off. A laser-cut portion (or laser-irradiated portion 46) is formed, so that a portion 14D of the wiring line connecting an end area 38 of the slit portion 371A and an end area 38 of the slit portion 370A is cut off. Consequently, the defective area attributable to the foreign substance 40 is electrically isolated, and thereby a failure caused by the defect such as a leak can be fixed.

Thus, due to the storage capacitor line 30 having two branch lines 32, 33 at each crossover section 35 where the storage capacitor line 30 intersects with a peripheral wiring line 14, defective areas can be efficiently fixed according to the present embodiment, even if defects such as leaks have been developed by intrusion of foreign substances 40 into respective crossover areas where the branch lines 32, 33 intersect with the peripheral wiring line 14.

That is, in the construction where each storage capacitor line 30 is thus divided into two branch lines 32, 33 at each crossover section 35, even when one branch line 32 has been cut off, the continuity of the storage capacitor line 30 can be maintained by the other branch line 33. Therefore, a defect, having been developed at the crossover area where the branch line 32 intersects with the peripheral wiring line 14, can be fixed simply by cutting off the branch line 32 with less time and effort. Thus, the defective area can be efficiently fixed.

In this case, the branch line 33 should be prevented from being cut off in order to maintain the continuity of the storage capacitor line 30. Accordingly, the plurality of slit portions 360A, 370A and the like are provided on the peripheral wiring line 14 so as to cross the branch lines 32, 33. Therefore, the foreign substance 40 can be electrically isolated, by cutting off the peripheral wiring line 14 starting at end areas 38 of the slit portions 370A crossing the branch line 33 so that laser-cut portions are formed to encircle the foreign substance 40. Thus, the defect can be certainly fixed.

Further, in the present embodiment, each storage capacitor line 30 includes branch points 31A, 31B, which are located at two points so that a peripheral wiring line 14 is arranged therebetween. The branch lines 32, 33 are provided between the branch points 31A, 31B.

When the branch points 31A, 31B are thus arranged at two points sandwiching the peripheral wiring line 4 or arranged just outside the crossover section 35 where the storage capacitor line 30 intersects with the peripheral wiring line 14, the branch line 32 or 33 can be cut off at a point located just outside the crossover section 35. Thereby, a defect of repair, which may be caused by a new leak due to contact between the peripheral wiring line 14 and the branch line 32 having been cut off, can be prevented.

In the present embodiment, the slit portions 360A, 370A and the like are provided on a peripheral wiring line 14 having a line width larger than that of a storage capacitor line 30. Further, the slit portions 360A and the like are arranged to cross the branch line 32, while the slit portions 370A and the like are arranged to cross the branch line 33. That is, the slit portions 360A and the like crossing the branch line 32 and the slit portions 370A and the like crossing the branch line 33 are provided individually or separately from each other.

When the slit portions 360A, 370A and the like are thus provided on the peripheral wiring lines 14 having a relatively large width, increase of the resistance of the wiring lines due to the provision of slit portions can be suppressed. Further, due to the separate slit portions 360A, 370A and the like individually arranged to cross the respective branch lines 32, 33, increase of the resistance of the wiring lines can be suppressed, compared to providing each slit portion arranged to cross a plurality of branch lines. Consequently, degradation of display performance may be prevented.

The medial area 39 of each slit portion 360A, 370A or the like or the area except both end areas 38 thereof is formed to have a width smaller than that of both end areas 38.

According to the construction in which the both end areas 38 to be used as a starting point at the time of cutting of the peripheral wiring line 14 are thus provided to have a relatively large width, repairs can be stably achieved. On the other hand, the medial area 39 is immune to being used as a starting point at the time of cutting, and therefore the width thereof can be set to be smaller than that of the both end areas 38. Thereby, the areas of slit portions can be reduced to be small, compared to simply providing slit portions of constant width equal to the width of the end areas 38. Consequently, increase of the resistance of the peripheral wiring lines 14 can be suppressed, which may prevent degradation of display performance.

Further, in the present embodiment, the cutout portions 360B, 370B and the like are provided on each peripheral wiring line 14 so as to be located at a predetermined distance from the respective slit portions 360A, 370A and the like.

According to the construction, a leak spot can be separated off by cutting off some portions of the peripheral wiring line 14 between the slit portions 370A and the like and the cutout portions 370B and the like. Thereby, a defect over a large area can be fixed, and therefore intrusion of a relatively-large foreign substance 40 can be treated. Moreover, compared to simply increasing the lengths of the slit portions 370A and the like in order to enable repair of a larger defective area, increase of the resistance of the peripheral wiring lines 14 can be suppressed, and consequently degradation of display performance may be prevented.

On the other hand, each gate wiring line 20 includes branch points 21A, 21B, which are located at two points so that the parallel-arranged two peripheral wiring lines 14 are arranged therebetween, as shown in FIG. 4. The two branch lines 22, 23, extending from one branch point 21A, cross or intersect with the two peripheral wiring lines 14, and converge at the other branch point 21B. Further, a link line 24 is provided in the gap section between the two peripheral wiring lines 14 so as to be connected between the branch lines 22, 23.

Figure 13:
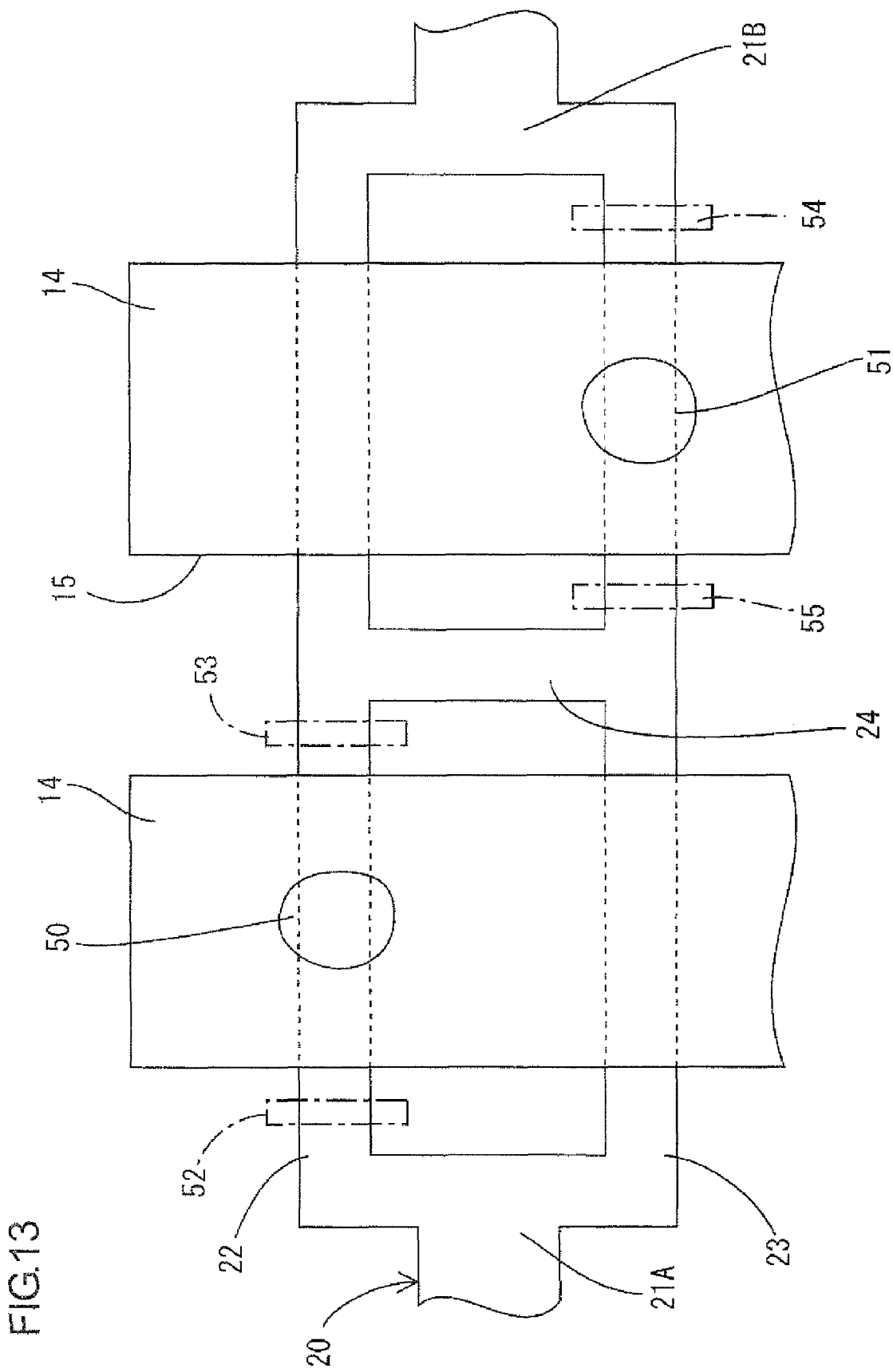
FIG. 13 is an explanatory diagram showing the operational effects of the liquid crystal display device according to the present embodiment.

According to the construction, referring to FIG. 13 (where the slit portions 260A, 270A and the like and the cutout portions 260B, 270B and the like are not shown), defect repair can be suitably achieved, when defects such as leaks between wiring lines have been developed by intrusion of a foreign substance 50 into the crossover area where the branch line 22 intersects with one of the peripheral wiring lines 14 and also by intrusion of another foreign substance 51 into the crossover area where the branch line 23 intersects with the other of the peripheral wiring lines 14.

Specifically, laser is applied to two points of the branch line 22 (laser-irradiation points marked with 52 and 53) to cut it off at those points by laser cutting that uses laser radiation. One of the points is located between the branch point 21A of the gate wiring line 20 ant the adjacent peripheral wiring line 14. The other point is located between the peripheral wiring line 14 and the link line 24. On the other hand, laser is applied to two points of the branch line 23 (laser-irradiation points marked with 54 and 55) to cut it off at those points by laser cutting that uses laser radiation. One of the points is located between the branch point 21B of the gate wiring line 20 ant the adjacent peripheral wiring line 14. The other point is located between the peripheral wiring line 14 and the link line 24. Consequently, the defects such as leaks developed by the intrusion of foreign substances 50, 51 can be fixed, while the connection on the gate wiring line 20 is maintained due to the link line 24 that connects the uncut portion of the branch line 22 and the uncut portion of the branch line 23.

In the construction where the link line 24 is provided in the gap section 15 between the two peripheral wiring lines 14 so as to connect the branch lines 22, 23, defective areas can be thus efficiently fixed even when both of the branch lines 22, 23 should be cut off, because the connection on the gate wiring line 20 can be maintained by the link line 24.

Next, a manufacturing method of the liquid crystal display device 1 will be explained.

The following explanation will mainly focus on a repair process of the manufacturing process.

First, a pair of substrates 2, 3 formed of light transmissive glass substrates should be prepared.

Then, gate wiring lines 20 (second wiring line) and storage capacitor lines 30 (second wiring line) are formed on the substrate 2, with widths of 10 µm to 30 µm (e.g., 30 µm as for gate wiring lines 20, and 20 µm as for storage capacitor lines 30).

A gate insulator 17 (insulating layer) is formed on the lines, and source wiring lines 13 and peripheral wiring lines 14 (first ring line) are further formed on the gate insulator 17. At the time, the peripheral wiring lines 14 are formed with a width of 500.0 µm to 600.0 µm (e.g., 500.0 µm), so as to be peripherally arranged along one side of the nondisplay area PA while intersecting with the gate wiring lines 20 and storage capacitor lines 30 (at crossover sections 25, 35), respectively (See FIG. 4).

In the above process of forming the gate wiring lines 20, each gate wiring line 20 is formed to include two branch lines 22, 23 at each crossover section 25. Specifically, the branch points 21A, 21B are located at two points so that two peripheral wiring lines 14 can be arranged therebetween, as shown in FIG. 4. The branch lines 22, 23 are provided between the branch points 21A, 21B.

Further, a link line 24 is formed in the gap section 15 between the adjacent two peripheral wiring lines 14, so as to be connected between the branch lines 22, 23.

In the process of forming the storage capacitor lines 30, each storage capacitor line 30 is formed to include two branch lines 32, 33 at each crossover section 35. Specifically, the branch points 31A, 31B are located at two points so that one peripheral wiring line 14 can be arranged therebetween, as shown in FIG. 4. The branch lines 32, 33 are provided between the branch points 31A, 31B.

In the process of forming the peripheral wiring lines 14, slit portions 260A, 270A and the like and cutout portions 260B, 270B and the like, arranged in a pattern shown in FIGS. 5 and 6, are formed at each crossover section 25 by mask etching using a photolithographic method.

The slit portions 260A, 270A and the like are arranged so that slit portions 260A and the like cross the branch line 22 while slit portions 270A and the like cross the branch line 33. At the time, the slit portions 260A and the like are arranged so as not to cross the branch line 33 while the slit portions 270A and the like are arranged so as not to cross the branch line 32. Consequently, each of slit portions 260A and the like is provided to be aligned with the corresponding one of slit portions 270A and the like (See FIG. 5).

As to the shapes of the slit portions 260A, 270A and the like, both end areas 28 of each slit portion 260A, 270A or the like are formed into square shapes while the medial area 29 thereof is formed to have a width smaller than that of both end areas 28.

On the other hand, each of the cutout portions 260B and the like is formed into a square shape, so as to be arranged at a predetermined distance from one end area 28 of the corresponding slit portion 260A or the like (i.e., arranged on the opposite side of the slit portion 270A or the like) while being aligned with the slit portion 260A or the like. The cutout portions 270B and the like are similarly arranged so as to be aligned with respective slit portions 270A and the like (See FIG. 5).

Further, slit portions 360A, 370A and the like and cutout portions 360B, 370B and the like are formed at each crossover section 35 where a peripheral wiring line 14 intersects with a storage capacitor line 30, so as to form a similar arrangement to that of the above slit portions 260A, 270A and the like and the cutout portions 260B, 270B and the like (See FIG. 8).

TFTs 11 and pixel electrodes 12 are further formed on the substrate 2, and an alignment film (not shown) is formed on the pixel electrodes 12.

On the other hand, a color filter (not shown) is formed on the substrate 3, if required. Further, a common electrode 6 is formed, and an alignment film (not shown) is formed on the common electrode 6.

After the electrodes and the like are thus formed on the substrates 2, 3, a sealant 7 is formed on at least one of the substrates 2, 3, and liquid crystal is dispensed into a space defined by the substrate 2, 3 and the sealant 7 in order to form a liquid crystal layer 4. Then, the substrates 2, 3 are attached to each other via the sealant 7. A polarizing plate and the like are further placed, and then the manufacturing process of the liquid crystal display device 1 as in FIGS. 1 and 3 is completed. The planar area corresponding to the liquid crystal layer 4 (or the area enclosed by the sealant 7) is provided as a display area AA, while an area having a frame-like shape surrounding the periphery of the display area AA is provided as a nondisplay area PA (See FIG. 3).

In the manufacturing method of the present embodiment, referring to FIG. 11 (where slit portions 370A, 370A and the like and cutout portions 360B, 370B and the like are not shown), if foreign substances 40 slip into the crossover section 35 (See FIG. 8) at which a peripheral wiring line 14 intersects with branch lines 32, 33 (or a storage capacitor line 30), a repair process is performed for fixing a leak that may occur between the storage capacitor line 30 and the peripheral wiring line 14. Note that the present embodiment includes an inspection process for checking for the presence of foreign substances 40 or the like prior to the repair process.

In the repair process, the branch line 32 is first cut off by laser radiation at a point located between the peripheral wiring line 14 and the branch point 31A of the storage capacitor line 30 and at a point located between the peripheral wiring line 14 and the branch point 31B, so that the branch line 32 is isolated by the laser-cut portions (or laser-irradiated portions marked with 41 and 42). Consequently, a failure caused by the defect such as a leak can be fixed.

Next, the defect at the branch line 33 will be fixed by utilizing the slit portions 370A and the like and the cutout portions 370B and the like provided on the peripheral wiring line 14.

Specifically, referring to FIG. 12, a portion 14A of the wiring line (i.e., the peripheral wiring line 14) connecting an end area 38 of the slit portion 370A and the cutout portion 370B is cut off by laser radiation, so that the end area 38 of the slit portion 370A communicates with the cutout portion 370B due to the laser-cut portion (or laser-irradiated portion designated by Symbol 43). Similarly, a laser-cut portion (or laser-irradiated portion 44) is formed, so that a portion 143 of the wiring line connecting the cutout portion 370B and the cutout portion 371B is cut off. Further, a laser-cut portion (or laser-irradiated portion 45) is formed, so that a portion 140 of the wiring line connecting the cutout portion 371B and an end area 38 of the slit portion 371A is cut off. A laser-cut portion (or laser-irradiated portion 46) is formed, so that a portion 140 of the wiring line connecting an end area 38 of the slit portion 371A and an end area 38 of the slit portion 370A is cut off. Consequently, the defective area attributable to the foreign substance 40 is electrically isolated, and thereby a failure caused by the defect such as a leak can be fixed.

Further, in the manufacturing method of the present embodiment, referring to FIG. 13 (where slit portions 260A, 270A and the like and cutout portions 260B, 270B and the like are not shown), if foreign substances 50, 51 slip into the crossover section 25 (See FIG. 5) at which a peripheral wiring line 14 intersects with the branch lines 22, 23 of a gate wiring line 20, a repair process is also performed for fixing a leak that may occur between the gate wiring line 20 and the peripheral wiring line 14.

Specifically, laser is applied to two points of the branch line 22 (laser-irradiation points marked with 52 and 53) to cut it off at those points by laser cutting that uses laser radiation. One of the points is located between the branch point 21A of the gate wiring line 20 ant the adjacent peripheral wiring line 14. The other point is located between the peripheral wiring line 14 and the link line 24. On the other hand, laser is applied to two points of the branch line 23 (laser-irradiation points marked with 54 and 55) to cut it off at those points by laser cutting that uses laser radiation. One of the points is located between the branch point 21B of the gate wiring line 20 ant the adjacent peripheral wiring line 14. The other point is located between the peripheral wiring line 14 and the link line 24. Consequently, the defects such as leaks developed by the intrusion of foreign substances 50, 51 can be fixed, while the connection on the gate wiring line 20 is maintained due to the link line 24 that connects the uncut portion of the branch line 22 and the uncut portion of the branch line 23.

The manufacturing method of the present embodiment thus including the repair process enables provision of a highly reliable liquid crystal display device. This is due to the branch lines 22, 23 or the branch lines 32, 33 provided in each crossover section 25 or 35 at which a peripheral wiring line 14 intersects with a gate wiring line 20 or a storage capacitor line 30. That is, a defect such as a leak can be fixed by cutting off the branch line corresponding to the defective area, when the defect has developed at the crossover section. Thus, the repair can be achieved with high efficiency and with certainty.

Further, due to the slit portions 260A, 270A and the like or the slit portions 360A, 370A and the like provided in each crossover section 25 or 35 so as to cross the branch lines 22, 23 or the branch lines 32, 33, a defective area can be fixed by cutting off some portions of the peripheral wiring line 14 between the slit portions, even when one branch line is left uncut as a result of the above defect repair involving cutoff of the branch line. Thus, the repair can be achieved with certainty.

Further, each storage capacitor line 30 includes branch points 31A, 31B, which are located at two points so that a peripheral wiring line 14 is arranged therebetween. The branch lines 32, 33 are provided between the branch points 31A, 31B (See FIGS. 8 and 11).

When the branch points 31A, 31B are thus arranged at two points sandwiching the peripheral wiring line 14 or arranged just outside the crossover section 35 where the storage capacitor line 30 intersects with the peripheral wiring line 14, the branch line 32 or 33 can be cut off at a point located just outside the crossover section 35. Thereby, a defect of repair, which may be caused by a new leak due to contact between the peripheral wiring line 14 and the branch line 32 having been cut off, can be prevented.

The slit portions 360A, 370A and the like are provided on a peripheral wiring line 14 having a line width larger than that of a storage capacitor line 30. Further, the slit portions 360A and the like are arranged to cross the branch line 32, while the slit portions 370A and the like are arranged to cross the branch line 33. That is, the slit portions crossing the branch line 32 and the slit portions crossing the branch line 33 are provided individually or separately from each other.

When the slit portions 360A, 370A and the like are thus provided on the peripheral wiring lines 14 having a relatively large width, increase of the resistance of the wiring lines due to the provision of slit portions can be suppressed. Further, due to the separate slit portions 360A, 370A and the like individually arranged to crass the respective branch lines 32, 33, an undue increase in the resistance of the wiring lines can be prevented, compared to providing each slit portion arranged to cross a plurality of branch lines.

The medial area 39 of each slit portion 360A, 370A or the like or the area except both end areas 38 thereof is formed to have a width smaller than that of both end areas 38.

The construction, in which the both end areas 38 to be used as a starting point at the time of cutting of the peripheral wiring line 14 are thus provided to have a relatively large width, enables improvement in precision of a cutting operation in the case of laser cutting. That is, repairs can be stably achieved without leaving unfinished laser-cut portions. On the other hand, the medial area 39 is immune to being used as a starting point at the time of cutting, and therefore the width thereof can be set to be smaller than that of the both end areas 38. Thereby, the areas of slit portions can be reduced to be small, compared to simply providing slit portions of constant width equal to the width of the end areas 38. Consequently, increase of the resistance of the peripheral wiring lines 14 can be suppressed, which may prevent degradation of display performance.

Further, the cutout portions 360B, 370B and the like are provided on each peripheral wiring line 14, so as to be located at a predetermined distance from the respective slit portions 360A, 370A and the like.

According to the construction, a leak spot can be separated off by cutting off some portions of the peripheral wiring line 14 between the slit portions 370A and the like and the cutout portions 370B and the like. Thereby, a defect over a large area can be fixed, and therefore intrusion of a relatively-large foreign substance 40 can be treated. Moreover, compared to simply increasing the lengths of the slit portions 370A and the like in order to enable repair of a larger defective area, increase of the resistance of the peripheral wiring lines 14 can be suppressed, and consequently degradation of display performance may be prevented.

Each gate wiring line 20 includes a link line 24 that is provided in the gap section between adjacent two peripheral wiring lines 14 so as to be connected between branch lines 22, 23 of the gate wiring line 20.

According to the construction, even when defects have occurred at both crossover areas where the peripheral wiring lines 14 intersect with respective branch lines 22, 23, repairs thereof may be achieved without utilizing the slit portions 260A, 270A and the like and therefore without requiring a lot of time and effort. That is, the defective areas can be efficiently fixed, because the connection on the gate wiring line 20 can be maintained by the link line 24 even if both branch lines 22, 23 are cut off, as long as the connection via the link line 24 is maintained.

Other Embodiments

Shown above are embodiments of the present invention. However, the present invention is not limited to the embodiments explained in the above description made with reference to the drawings. The following embodiments may be included in the technical scope of the present invention, for example.

(1) In the above embodiment, after formation of gate wiring lines 20 and storage capacitor lines 30, peripheral wiring lines 14 are formed thereon via a gate insulator 17. However, after formation of peripheral wiring lines 14, gate wiring lines 20 and storage capacitor lines 30 may be formed thereon via a gate insulator 17.

(2) In the above embodiment, branch points on a gate wiring line 20 or a storage capacitor line 30 are located at two points sandwiching a peripheral wiring line 14. However, branch points may be provided within the crossover section at which the line intersects with the peripheral wiring line.

(3) In the above embodiment, branch points 21A, 21B on a gate wiring line 20 are located at two points so that two peripheral wiring lines 14 can be arranged therebetween. However, any number of peripheral wiring lines 14 may be arranged between the branch points 21A, 21B. For example, branch points may be located at two points so that all the provided peripheral wiring lines can be arranged therebetween.

(4) In the above embodiment, branch points 31A, 31B on a storage capacitor line 30 are located at two points so that one peripheral wiring line 14 can be arranged therebetween. However, any number of peripheral wiring lines 14 may be arranged between the branch points 31A, 31B. For example, branch points may be located at two points so that all the peripheral wiring lines, provided nearer to the display area in relation to the peripheral wiring line to which the storage capacitor line is connected via a contact hole, can be arranged therebetween.

(5) In the above embodiment, a gate wiring line 20 or a storage capacitor line 30 is arranged to branch into two branch lines. However, the number of branch lines may be set to any number with limits of not less than two, based on consideration of effects of reduced widths of branch lines, such as increase of electrical resistance.

Figure 14:
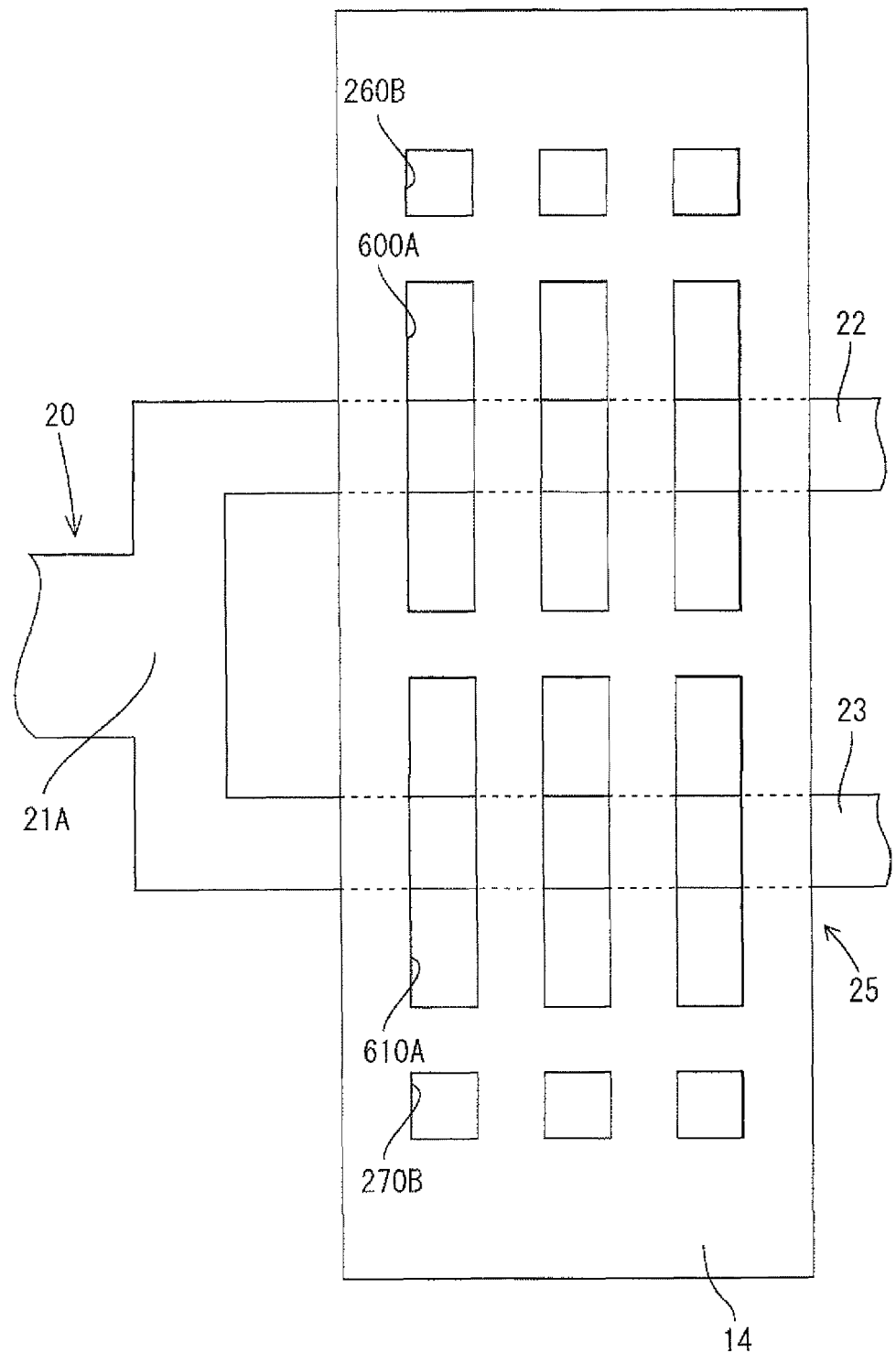
FIG. 14 is a diagram schematically showing a modification of slit portions.

(6) In the above embodiment, each slit portion is formed to have a smaller width at the medial area than at both end areas. However, each slit portion 600A, 610A or the like may be formed to have a constant width, as shown in FIG. 14, for example.

Figure 15:
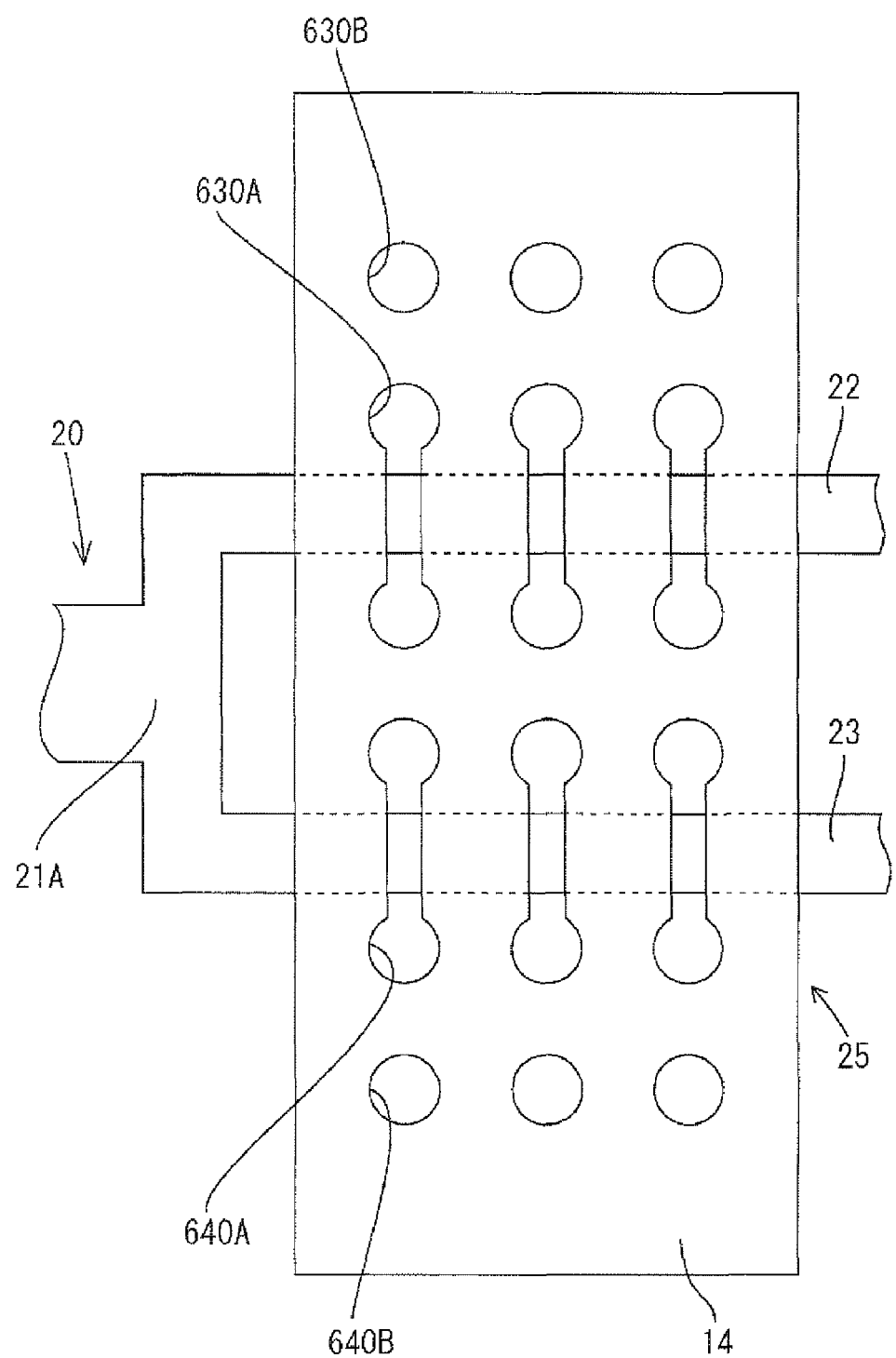
FIG. 15 is a diagram schematically showing a modification of slit portions and cutout portions.

(7) in the above embodiment, the end areas of the slit portions and the like, or the cutout portions and the like are individually formed into a rectangular shape. However, the end areas of slit portions 630A, 640A and the like, or cutout portions 630B, 640B and the like may be formed into a circular shape as shown in FIG. 15, for example, as long as the opening size thereof is set to be sufficiently larger than the laser beam width.

Figure 16:
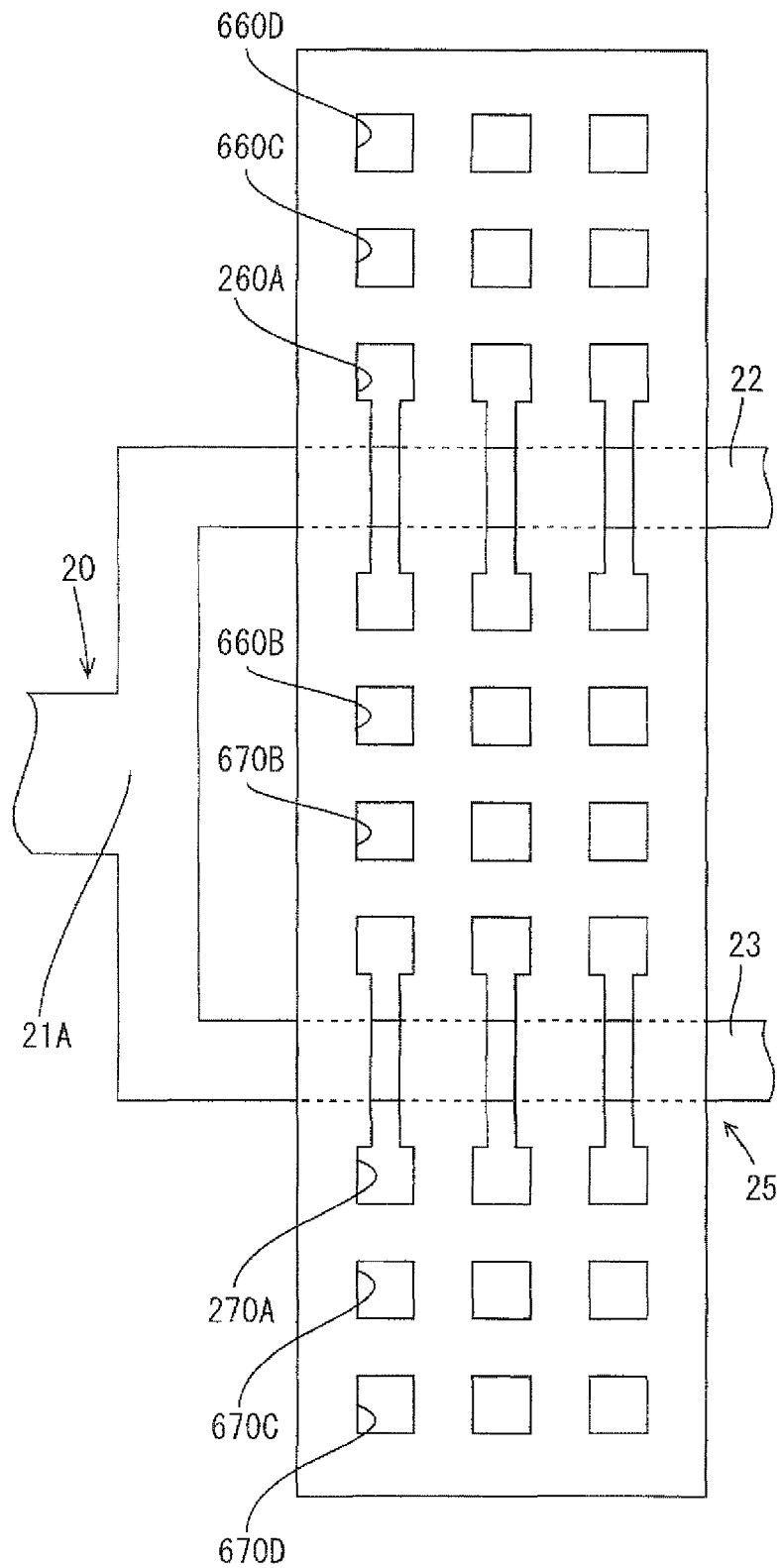
FIG. 16 is a diagram schematically showing a modification of cutout portions.

(8) In the above embodiment, a cutout portion is provided solely on the side of one end portion of each slit portion. However, cutout portions may be provided on both sides. Further, any number of columns of cutout portions may be provided as long as the wiring resistance is within the permissible limits. For example, cutout portions 660B, 670B and the like can be arranged in a pattern shown in FIG. 16.

(9) In the above embodiment, a liquid crystal display device is shown for illustrative purposes. However, the construction according to the present invention can be employed on another type of display device such as an EL display device or a plasma display device.

The invention claimed is:

1. A display device including a display area capable of image display and a nondisplay area provided outside said display area, said display device comprising:
   a first wiring line provided in said nondisplay area;
   a second wiring line provided in said nondisplay area, said second wiring line being arranged across an insulating layer from said first wiring line so that a crossover section at which said first wiring line intersects with said second wiring line is provided in said nondisplay area;
   wherein said second wiring line includes a plurality of branch lines branching therefrom and being located in said crossover section, while said first wiring line includes a plurality of slit portions arranged to cross said branch lines in said crossover section;
   wherein said first wiring line includes a plurality of first wiring lines;
   wherein said branch lines are arranged to cross at least two of said first wiring lines; and
   wherein said second wiring line includes a link line which is arranged in a gap section between adjacent two of said first wiring lines so as to be connected between said plurality of branch lines.

2. A display device as in claim 1, wherein:
   said second wiring line includes branch points for branching, which are located at two points so that at least one first wiring line as said first wiring line is arranged therebetween; and
   said plurality of branch lines are provided between said two branch points.

3. A display device as in claim 1, wherein a width of said first wiring line is set to be larger than a width of said second wiring line.

4. A display device as in claim 1, wherein:
   said nondisplay area has a frame-like shape surrounding said display area; and
   at least one of said first wiring line and said second wiring line is provided as a peripheral wiring line that is peripherally arranged along at least one side of said nondisplay area having a frame-like shape.

5. A display device as in claim 1, wherein:
   a thin-film transistor is provided in said display area;
   said first wiring line is provided as a peripheral wiring line that is peripherally arranged in said nondisplay area so as to supply a signal for capacitance formed in said display area; and
   said second wiring line includes at least one wiring line provided as a gate wiring line that is arranged to supply a gate signal to a gate electrode of said thin-film transistor.

6. A display device as in claim 1, wherein:
   a thin-film transistor is provided in said display area;
   said first wiring line is provided as a peripheral wiring line that is peripherally arranged in said nondisplay area so as to supply a signal for capacitance formed in said display area; and
   said second wiring line includes at least one wiring line provided as a storage capacitor line, which is connected to said peripheral wiring line and is arranged to extend in a direction intersecting with said peripheral wiring line so as to supply the signal for the capacitance formed in said display area.

7. A display device as in claim 1, wherein said slit portions include slit portions crossing respective branch lines separately, so that each slit portion is prevented from crossing a plurality of branch lines.

8. A display device as in claim 1, wherein said slit portions have a smaller width in a medial area as an area except both end areas of each slit portion, than in both end areas of each slit portion.

9. A display device as in claim 1, wherein said first wiring line having said slit portions includes cutout portions arranged at a predetermined distance from said slit portions.

10. A display device as in claim 1, wherein:
   a liquid crystal layer is provided between a pair or substrates; and
   a planar area corresponding to said liquid crystal layer is provided as said display area.

\* \* \* \* \*